United States Patent
Matsuura

(10) Patent No.: US 9,195,059 B2
(45) Date of Patent: Nov. 24, 2015

(54) OPTICAL SCANNER

(71) Applicant: BROTHER KOGYO KABUSHIKI KAISHA, Nagoya-shi, Aichi-ken (JP)

(72) Inventor: Minoru Matsuura, Nagoya (JP)

(73) Assignee: BROTHER KOGYO KABUSHIKI KAISHA, Nagoya-Shi, Aichi-Ken (JP)

(*) Notice: Subject to any disclaimer, the term of this patent is extended or adjusted under 35 U.S.C. 154(b) by 130 days.

(21) Appl. No.: 13/748,405

(22) Filed: Jan. 23, 2013

(65) Prior Publication Data

US 2013/0188234 A1    Jul. 25, 2013

(30) Foreign Application Priority Data

Jan. 23, 2012 (JP) .................................. 2012-011398

(51) Int. Cl.
 *G02B 26/12* (2006.01)
 *G02B 26/10* (2006.01)
 *G02B 7/02* (2006.01)

(52) U.S. Cl.
 CPC ............. *G02B 26/10* (2013.01); *G02B 7/025* (2013.01); *G02B 26/125* (2013.01)

(58) Field of Classification Search
 CPC ............... G02B 26/00; G02B 26/02–26/04; G02B 26/08–26/0891; G02B 26/10
 USPC .......... 359/196.1, 197.1, 209.1, 210.1–210.2, 359/221.2
 See application file for complete search history.

(56) References Cited

U.S. PATENT DOCUMENTS

| | | | | |
|---|---|---|---|---|
| 5,526,193 | A * | 6/1996 | Anzai | 359/819 |
| 2001/0021057 | A1* | 9/2001 | Fukita et al. | 359/205 |
| 2004/0130800 | A1* | 7/2004 | Honda | 359/668 |
| 2012/0194878 | A1* | 8/2012 | Nakamura | 358/471 |

FOREIGN PATENT DOCUMENTS

| | | |
|---|---|---|
| JP | 3-84513 A | 4/1991 |
| JP | H04-253011 A | 9/1992 |
| JP | 6-282014 A | 10/1994 |

OTHER PUBLICATIONS

Japan Patent Office, Notification of Reasons for Refusal for Japanese Patent Application No. 2012-011398 (counterpart Japanese patent application), dispatched Jul. 23, 2015.

* cited by examiner

*Primary Examiner* — Scott J Sugarman
*Assistant Examiner* — Robert E Tallman
(74) *Attorney, Agent, or Firm* — Merchant & Gould PC

(57) ABSTRACT

Optical scanner for scanning a target surface with a light beam includes: a light deflector deflecting the light beam; a scanning lens made of resin and condensing the light beam deflected by the light deflector onto the target surface to form an image thereon; a frame to which the scanning lens is fixed and having a coefficient of linear expansion smaller than that of the scanning lens. The scanning lens is fixed to the frame at a first attachment portion and at least one second attachment portion of the scanning lens using adhesives. The first attachment portion is located closer to a center portion of a scanning range in a main scanning direction of the scanning lens than the second attachment portion is. A first adhesive used for the first attachment portion has an elastic coefficient greater than that of a second adhesive used for the second attachment portion.

13 Claims, 4 Drawing Sheets

OPTICAL SCANNER

CROSS-REFERENCE TO RELATED APPLICATION(S)

This application claims priority from Japanese Patent Application No. 2012-011398 filed on Jan. 23, 2012, the disclosure of which is incorporated herein by reference in its entirety.

TECHNICAL FIELD

The present invention relates to an optical scanner in which a scanning lens is fixed to a frame by adhesive.

BACKGROUND ART

In a generally known structure, an optical scanner used for a laser printer and the like has a frame to which a plastic scanning lens is fixed by adhesive.

However, since the scanning lens has a coefficient of linear expansion greater than that of the frame, if the scanning lens of the conventional structure undergoes thermal expansion, for example, under high temperature environment, distortion occurs due to difference between a linear expansion of the scanning lens and a linear expansion of the frame. Accordingly, a lens attachment portion where the scanning lens is fixed to the frame is subject to a load, with the result that the scanning lens may disadvantageously come off the frame.

In view of the above, it would be desirable to provide an optical scanner which can prevent the scanning lens from coming off the frame when the optical scanner is used under high temperature environment.

SUMMARY OF THE INVENTION

According to an aspect of the present invention, there is provided an optical scanner for scanning a target surface with a light beam in a main scanning direction, which comprises: a light deflector configured to deflect the light beam; a scanning lens made of resin and configured to condense the light beam deflected by the light deflector onto the target surface to form an image thereon; a frame to which the scanning lens is fixed and having a coefficient of linear expansion smaller than that of the scanning lens. In this optical scanner, the scanning lens is fixed to the frame at a first attachment portion and at least one second attachment portion of the scanning lens using adhesives. Further, the first attachment portion is located closer to a center portion of a scanning range in a main scanning direction of the scanning lens than the second attachment portion is, and a first adhesive used for the first attachment portion has an elastic coefficient greater than that of a second adhesive used for the second attachment portion.

BRIEF DESCRIPTION OF THE DRAWINGS

To better understand the claimed invention, and to show how the same may be carried into effect, reference will now be made, by way of example only, to the accompanying drawings, in which:

DESCRIPTION OF EMBODIMENT

A detailed description will be given of an illustrative embodiment of the present invention with reference to the accompanying drawings. In the following description, a general arrangement of an optical scanner according to one exemplary embodiment of the present invention will be briefly described, and thereafter the structure for mounting a scanning lens to a frame will be described in detail.

Figure 1:
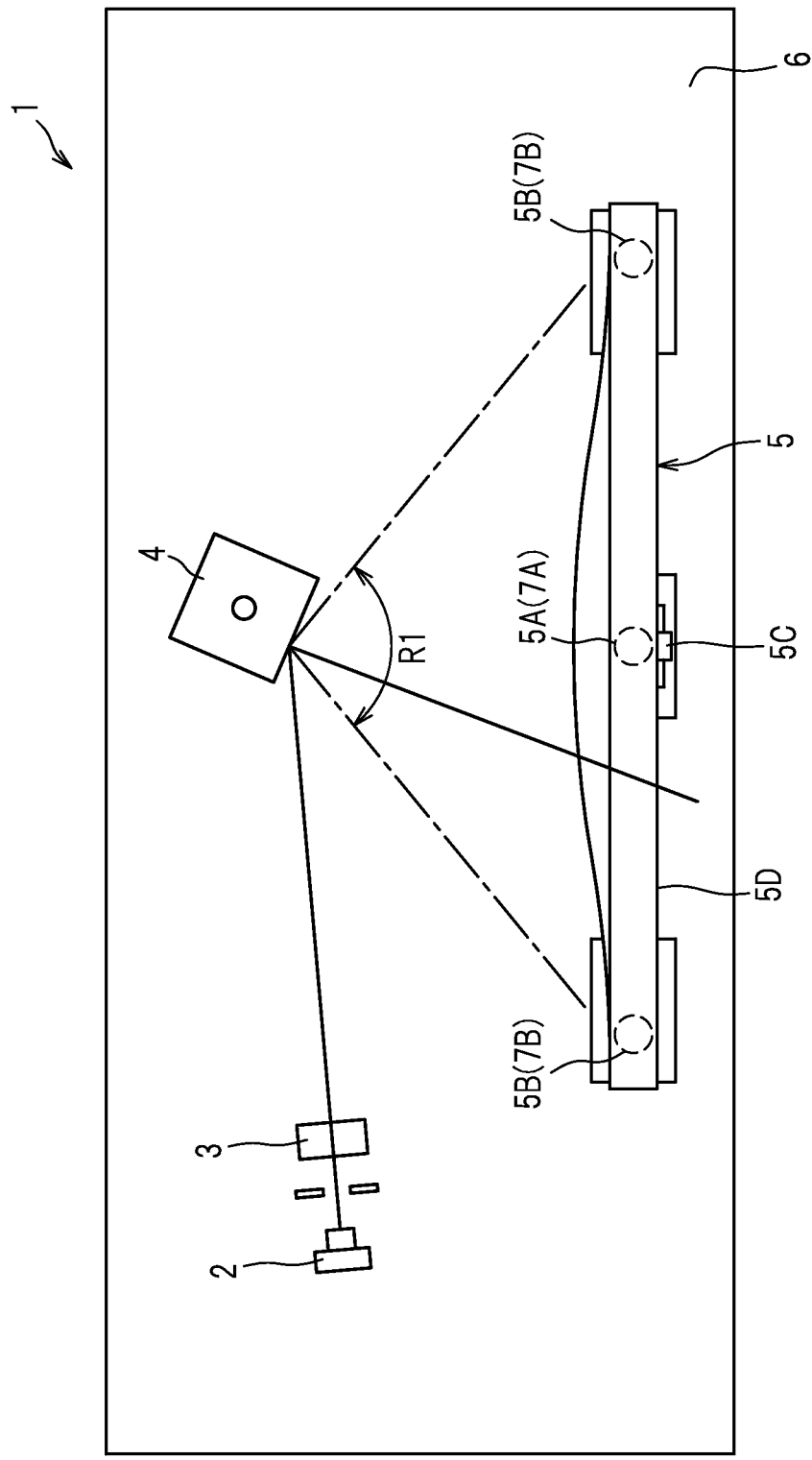
FIG. 1 is a top view of an optical scanner according to one exemplary embodiment of the present invention.

As seen in FIG. 1, an optical scanner 1 includes a light source device 2, a cylindrical lens 3, a polygon mirror 4 as an example of a light deflector, a scanning lens 5, and a frame 6.

The light source device 2 includes a light source configured to emit a laser beam, a coupling lens (not shown) configured to converge the laser beam from the light source and convert it into a parallel beam of light.

The cylindrical lens 3 is a lens for correcting optical face tangle errors of the polygon mirror 4 and configured to converge the light beam from the light source device 2 in a sub-scanning direction (i.e., direction orthogonal to a main scanning direction) and to direct it onto the polygon mirror 4.

The polygon mirror 4 is configured to rotate at high speeds and four sides constituting mirror surfaces are formed around the rotating axis. The mirror surfaces of the rotating polygon mirror 4 reflect the light beam having passed through the cylindrical lens 3, so that the light beam is deflected in the main scanning direction.

In the range of deflection where the polygon mirror 4 deflects the light beam, the range shown by angle R1 corresponds to the scanning range used for the image formation.

The scanning lens 5 is made of resin (plastic). The scanning lens is configured to convert the laser beam having been swept out by the polygon mirror 4 at a constant angular velocity into a laser beam sweeping at a constant linear velocity, and to condense it onto a target surface to form an image thereon.

The scanning lens 5 has an elongate shape extending in the main scanning direction. Further, the scanning lens 5 has a positioning portion 5C having a rectangular section and protruding from a light beam exit surface 5D of the scanning lens 5.

Figure 3:
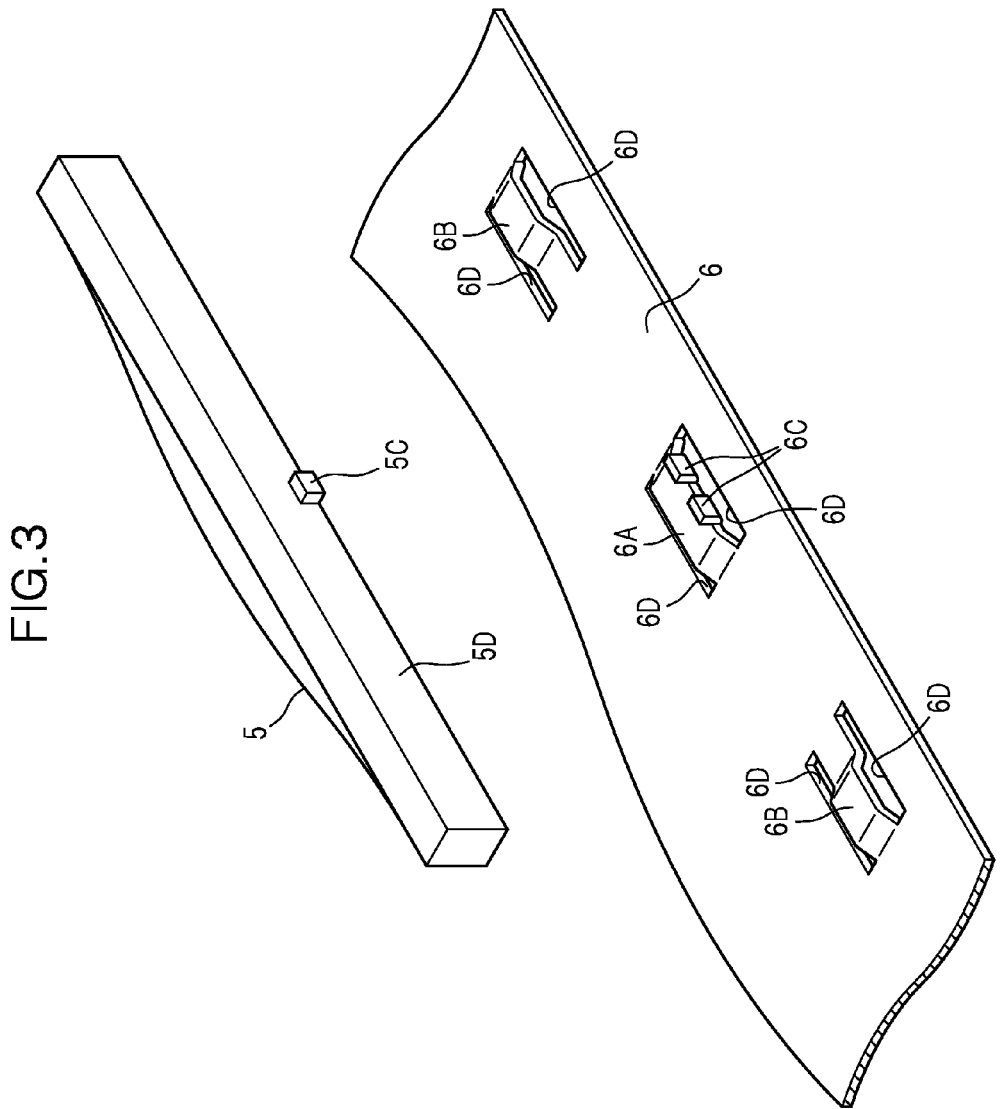
FIG. 3 is a perspective view showing a positioning portion of the scanning lens and frame-side attachment portions of the frame.

As seen in FIG. 3, the positioning portion 5C is formed on the light beam exit surface 5D of the scanning lens 5 at an edge closer to the frame 6, such that the positioning portion 5C does not interfere with the light beam from the polygon mirror 4.

Figure 2:
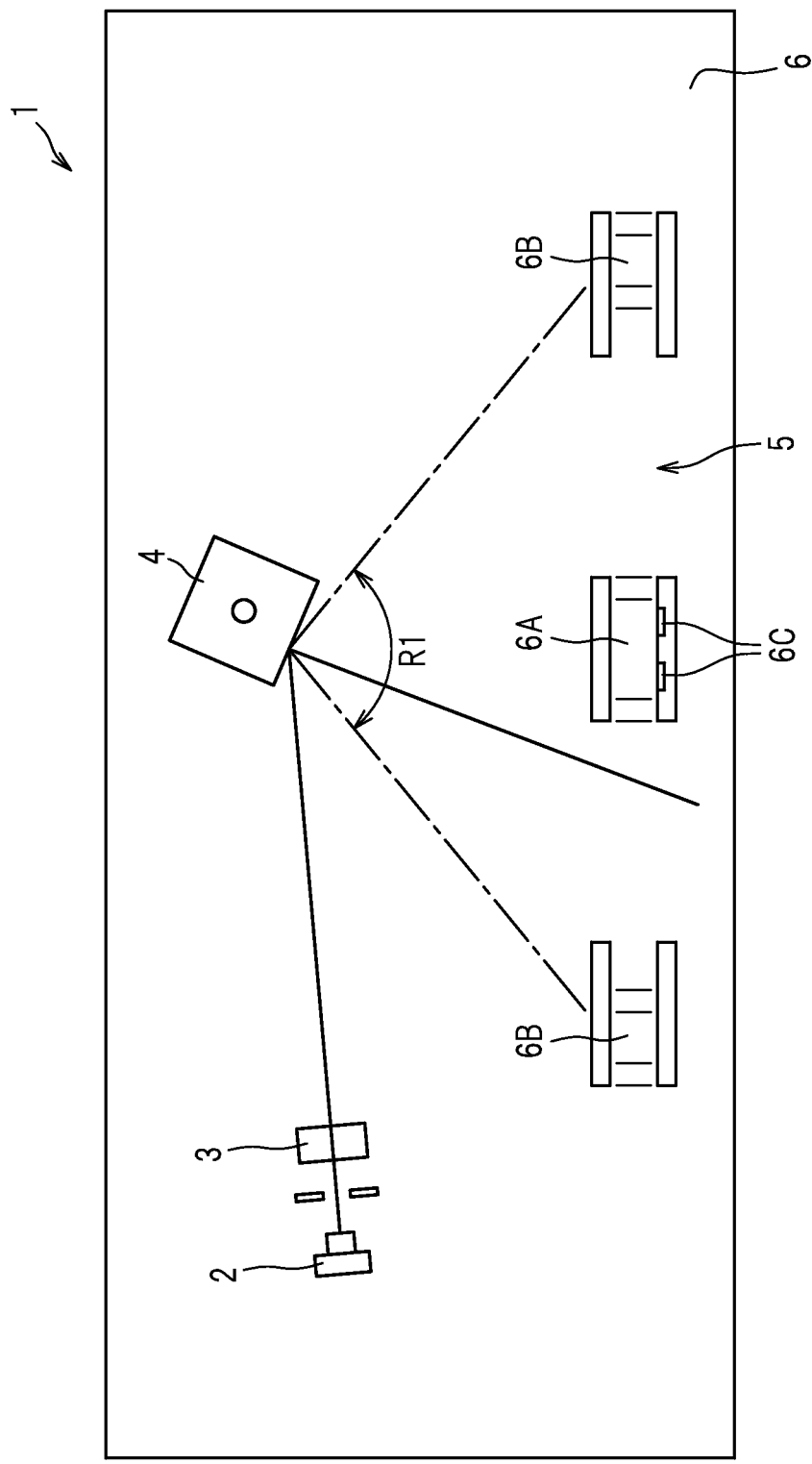
FIG. 2 is a top view similar to FIG. 1, but the optical scanner is shown without a scanning lens.

The frame 6 is configured to support various optical elements constituting the optical scanner 1. As seen in FIGS. 2 and 3, the frame 6 has a first frame-side attachment portion 6A and a pair of second frame-side attachment portions 6B for supporting the scanning lens 5. The first frame-side attachment portion 6A is provided substantially at a center portion of the scanning range of the light beam deflected by the polygon mirror 4. The second frame-side attachment portions 6B are provided at both sides of the first frame-side attachment portion 6A in the main scanning direction. The first frame-side attachment portion 6A is located in the middle of the pair of second frame-side attachment portions 6B.

The frame 6 is made of a material having a coefficient of liner expansion smaller than that of the scanning lens 5. According to this embodiment, the frame 6 is made of a metal plate.

As seen in FIG. 3, the first frame-side attachment portion 6A and the second frame-side attachment portions 6B are formed as planar portions protruding toward the scanning lens 5. This makes it possible to reduce the size of the planar surfaces of the first and second frame-side attachment portions 6A, 6B, with the result that the dimension accuracy of the first frame-side attachment portion 6A and the second frame-side attachment portions 6B can be readily ensured. It is noted that the frame 6 has rectangular through-holes 6D extending in the main scanning direction, at both sides of the first frame-side attachment portion 6A and the second frame-side attachment portions 6B corresponding to the light beam incident side and the light beam exit side of the scanning lens 5. The stiffness of the frame 6 around the first frame-side attachment portion 6A and the second frame-side attachment portions 6B is weak because of these through-holes 6D, and thus formation of the first frame-side attachment portion 6A and the second frame-side attachment portions 6B can be readily made by drawing process.

The first frame-side attachment portion 6A has a pair of cut-raised portions 6C protruding toward the scanning lens 5. The cut-raised portions 6C are spaced apart from each other and arranged at positions corresponding to the size of the positioning portion 5C of the scanning lens 5 in the main scanning direction.

As seen in FIG. 1, the scanning lens 5 is fixed to the frame 6 at the first frame-side attachment portion 6A and at the second frame-side attachment portions 6B by adhesives 7A, 7B. To be more specific, a first adhesive 7A is adhered to the first frame-side attachment portion 6A, and a portion of the scanning lens 5 which corresponds to the first frame-side attachment portion 6A and to which the first adhesive 7A is adhered is referred to as a first attachment portion 5A. Similarly, a second adhesive 7B is adhered to the second frame-side attachment portions 6B, and portions of the scanning lens 5 which correspond to the second frame-side attachment portions 6B and to which the second adhesive 7B is adhered are referred to as second attachment portions 5B. The first attachment portion 5A is disposed in a center portion of the scanning lens 5 such that it overlaps the positioning portion 5C in the main scanning direction. The two second attachment portions 5B are arranged in line in the main scanning direction and symmetrical with respect to the first attachment portion 5A.

Further, the first adhesive 7A for fixing the scanning lens 5 at the first attachment portion 5A has an elastic coefficient greater than that of the second adhesive 7B for fixing the scanning lens 5 at the second attachment portions 5B.

Figure 4:
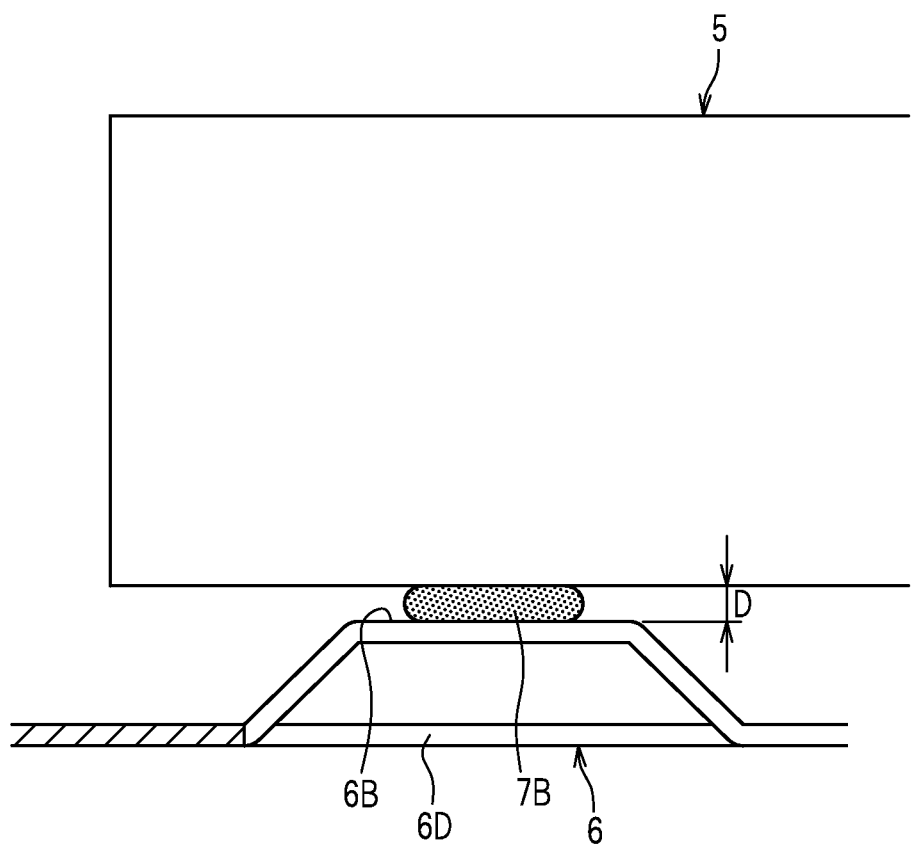
FIG. 4 is an enlarged view showing the scanning lens fixed to the frame by adhesive.

Further, as seen in FIG. 4, the scanning lens 5 and the frame 6 are fixed together such that the second attachment portions 5B and the second frame-side attachment portions 6B are spaced apart by a distance D and bonded together by the second adhesive 7B. Although not shown in the drawings, the scanning lens 5 and the frame 6 are fixed together such that the first attachment portion 5A and the first frame-side attachment portion 6A are spaced apart by the distance D and bonded together by the first adhesive 7A.

When mounting the scanning lens 5 to the frame 6, the first adhesive 7A having a higher elastic coefficient is applied on the first frame-side attachment portion 6A, and the second adhesive 7B having a smaller elastic coefficient is applied on the second frame-side attachment portions 6B. For the purpose of rapidly curing the adhesives, it is preferable that the first and second adhesives 7A, 7B are ultraviolet curable resins.

Next, positioning of the scanning lens 5 in the main scanning direction is carried out by engaging the positioning portion 5C of the scanning lens 5 with the pair of cut-raised portions 6C of the frame 6. This allows the first attachment portion 5A to be positioned in the center portion of the scanning range in the main scanning direction of the scanning lens 5.

Thereafter, adjustment of the scanning lens 5 is carried out. To be more specific, while the light source device 2 emits the light beam, the scanning lens 5 is moved to adjust its position until the light beam passing through the scanning lens 5 and condensed onto a target surface of an inspection device creates an appropriate image point. In this process, the angle of the scanning lens 5 may be adjusted where necessary. Once the angle of the scanning lens 5 is determined, the first and second adhesives 7A, 7B are cured by illumination with ultraviolet light.

In this process, since the first frame-side attachment portion 6A and the second frame-side attachment portions 6B are formed to ensure a sufficient thickness of the first and second adhesives 7A, 7B, the scanning lens 5 does not come in contact with the first frame-side attachment portion 6A and the second frame-side attachment portions 6B during the adjustment of the angle of the scanning lens 5. This makes it possible to readily adjust the position of the scanning lens 5.

According to the optical scanner 1 as described above, if the temperature changes in the usage environment (e.g., the temperature increases), the scanning lens 5 undergoes a dimensional change larger than the frame 6 does, because the coefficient of linear expansion of the scanning lens 5 is greater than that of the frame 6. In this instance, since the first adhesive 7A used for the first attachment portion 5A has an elastic coefficient greater than that of the second adhesive 7B used for the second attachment portions 5B, the first adhesive 7A is less deformable than the second adhesive 7B.

For this reason, the position of the scanning lens 5 in the main scanning direction is determined mainly based on the first attachment portion 5A to which the first adhesive 7A is adhered. The second adhesive 7B deforms to absorb a shift in position, after expansion, between each second attachment portion 5B of the scanning lens 5 and the corresponding second frame-side attachment portion 6B of the frame 6.

It is noted that since the first attachment portion 5A is located at the center portion of the scanning lens 5 in the main scanning direction, even if the temperature increases, the scanning lens 5 remains accurately positioned in the main scanning direction relative to the frame 6. Further, since the elastic coefficient of the second adhesive 7B is small, the second adhesive 7B deforms under high temperature environment to absorb the difference in the dimensional change between the frame 6 and the scanning lens 5. This can prevent the scanning lens 5 from coming off the frame 6. Especially, in this embodiment, since the scanning lens 5 is fixed to the frame 6 such that the second attachment portions 5B are spaced apart from the second frame-side attachment portion 6B by the distance D, the thickness of the second adhesive 7B can be ensured to ease the deformation of the second adhesive 7B.

Further, since the second attachment portions 5B are symmetrically arranged with respect to the first attachment portion 5A, forces applied from the first and second adhesives 7A, 7B to the scanning lens 5 through the first attachment portion 5A and the second attachment portions 5B are symmetrical with respect to the first attachment portion 5A. Therefore, even if the temperature increases, the deformation in the shape of the scanning lens 5 is relatively small. Especially, in this embodiment, since the first attachment portion 5A is located at the center portion of the scanning range in the main scanning direction of the scanning lens 5, distortion caused by the temperature change can be smaller.

It is to be understood that if the temperature decreases, similar advantageous effects as those described in the case of temperature increase can be obtained.

In the optical scanner 1 as described above, since the frame 6 is made of a metal plate, it is possible to considerably reduce the cost as compared to a frame made of plastic.

Although an illustrative embodiment of the present invention has been described in detail, the present invention is not limited to this specific embodiment. It is to be understood that various changes and modifications may be made without departing from the scope of the appended claims.

In the above exemplary embodiment, two sets of second attachment portions 5B and second frame-side attachment portions 6B are provided. However, the number of these sets may be one, or alternatively, three or more.

In the above exemplary embodiment, only one scanning lens 5 is provided. However, a plurality of scanning lenses 5 may be provided. In this instance, at least one of the plurality of scanning lenses 5 may be fixed to the frame 6 using the first and second adhesives having different elastic coefficients as described in the claims.

In the above exemplary embodiment, the same second adhesive 7B is used for the two second attachment portions 5B. However, a plurality of different adhesives with different elastic coefficients may be used as the second adhesives, as long as their elastic coefficients are smaller than that of the first adhesive used for the first attachment portion 5A.

In the above exemplary embodiment, the scanning lens 5 includes the protruding positioning portion 5C having a rectangular section. However, the present invention is not limited to this specific configuration. For example, the positioning portion may be formed as a circular cylindrical projection.

Further, in the above embodiment, the distance D between the first attachment portion 5A and the first frame-side attachment portion 6A is the same as the distance D between each second attachment portion 5B and the corresponding second frame-side attachment portion 6B. However, the present invention is not limited to this specific configuration. For example, the first frame-side attachment portion 6A and the second frame-side attachment portions 6B can be formed such that the distance between the first attachment portion 5A and the first frame-side attachment portion 6A is smaller than the distance between each second attachment portion 5B and the corresponding second frame-side attachment portion 6B. With this configuration, the thickness of the first adhesive 7A is smaller than that of the second adhesive 7B, so that the first adhesive 7A is less likely to deform and thus the scanning lens 5 can be accurately fixed to the frame 6.

What is claimed is:

1. An optical scanner for scanning a target surface with a light beam in a main scanning direction, the optical scanner comprising:
   a light deflector configured to deflect the light beam;
   a scanning lens made of resin and configured to condense the light beam deflected by the light deflector onto the target surface to form an image thereon;
   a frame to which the scanning lens is fixed and having a coefficient of linear expansion smaller than that of the scanning lens,
   wherein the scanning lens is fixed to the frame at one first attachment portion and at least one second attachment portion of the scanning lens using adhesives,
   wherein the first attachment portion is located closer to a center portion of a scanning range in a main scanning direction of the scanning lens than the at least one second attachment portion is,
   wherein a first adhesive and a second adhesive are used to fix the scanning lens to the frame, and the first adhesive is adhered to the first attachment portion and the second adhesive is adhered to the at least one second attachment portion,
   wherein after the first adhesive and the second adhesive are cured, an elastic coefficient of the first adhesive is greater than that of the second adhesive,
   wherein the frame comprises:
     a base on which the light deflector is rotatable mounted;
     a first frame-side attachment portion which protrudes from the base toward the scanning lens and to which the first adhesive is adhered; and
     at least one second frame-side attachment portion which protrudes from the base toward the scanning lens and to which the second adhesive is adhered,
   wherein each of the first and second frame-side attachment portions comprises:
     a slanted surface obliquely extending from the base toward the scanning lens; and
     a placement surface connected to the slanted surface and extending along the base, the placement surface configured to face the scanning lens and to be adhered with one of the first adhesive and the second adhesive,
   wherein rectangular through-holes are formed in the base corresponding to the first and second frame-side attachment portions, and
   wherein the slanted surface is formed on a plate member having a first end connected to an edge of the rectangular through-hole and a second end opposite to the first end and connected to the placement surface.

2. The optical scanner according to claim 1, wherein the frame is made of a metal plate.

3. The optical scanner according to claim 1, wherein the scanning lens has an elongate shape extending in the main scanning direction, and a plurality of second attachment portions are symmetrically arranged with respect to the first attachment portion in the main scanning direction.

4. The optical scanner according to claim 1, wherein the first attachment portion is located at the center portion of the scanning range in the main scanning direction of the scanning lens.

5. The optical scanner according to claim 1, wherein the scanning lens has a positioning portion used for positioning in the main scanning direction relative to the frame, and the positioning portion is disposed at a position overlapping the first attachment portion in the main scanning direction.

6. The optical scanner according to claim 1,
   wherein the placement surface of the at least one second frame-side attachment portion is entirely spaced apart from the at least one second attachment portion.

7. The optical scanner according to claim 6,
   wherein the placement surface of the first frame-side attachment portion is entirely spaced apart from the first attachment portion.

8. The optical scanner according to claim 3, wherein a distance between the first attachment portion and the frame is the same as a distance between each second attachment portion and the frame.

9. The optical scanner according to claim 3, wherein a distance between the first attachment portion and the frame is smaller than a distance between each second attachment portion and the frame.

10. The optical scanner according to claim 1, wherein the scanning lens comprises a lens body and a positioning portion protruding from the lens body in a direction away from the light deflector, and wherein the placement surface of the first frame-side attachment portion has an engagement portion configured to be engageable with the positioning portion of the scanning lens in the main scanning direction.

11. The optical scanner according to claim 1, wherein the first attachment portion of the scanning lens and the frame are fixed together by the first adhesive only, and the at least one second attachment portion of the scanning lens and the frame are fixed together by the second adhesive only.

12. The optical scanner according to claim 1, wherein the placement surface is disposed in the rectangular through-hole when the placement surface is projected in a direction in which an axis of rotation of the light deflector extends.

13. The optical scanner according to claim 1, wherein the placement surface of the first frame-side attachment portion has a length in a longitudinal direction of the scanning lens longer than that of the placement surface of the second frame-side attachment portion.

\* \* \* \* \*